Feb. 10, 1942.　　　H. HEBO　　　2,272,992
GENERATOR FOR ULTRAVIOLET ENERGY
Filed Sept. 17, 1938
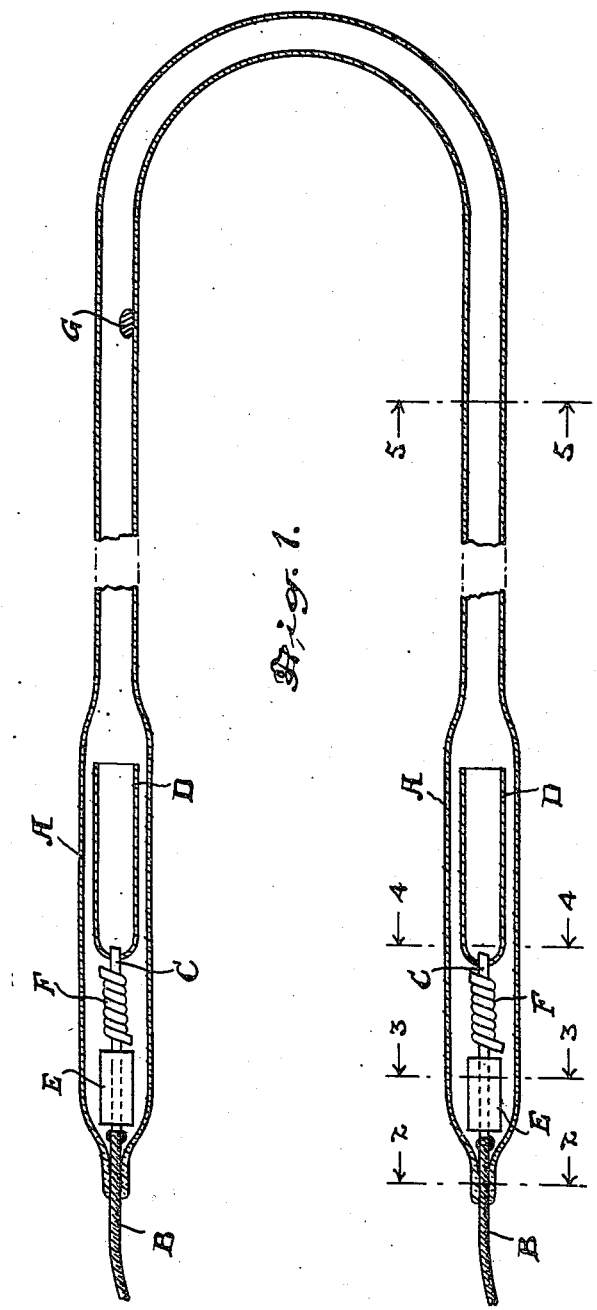
Inventor:
Halfdan Hebo.

Patented Feb. 10, 1942

2,272,992

UNITED STATES PATENT OFFICE 2,272,992

GENERATOR FOR ULTRAVIOLET ENERGY

Halfdan Hebo, New York, N. Y.

Application September 17, 1938, Serial No. 230,359

15 Claims. (Cl. 176—122)

This invention relates to the "geissler" type of electrically energized tube for the generation of ultra-violet energy, and is particularly devised for the purpose of irradiating ergosterol, bacteria or products containing ergosterol or bacteria, and it may also be used for therapeutic treatment.

Scientific research has determined that part of the spectrum which is able to destroy bacteria and to activate ergosterol has been defined to a narrow band in which the rays are measured as approximately between two thousand, five hundred and three thousand Angström units or A. U.

The principal objects of this invention are to devise a generator which will be extremely efficient in its irradiating value and will maintain a long life with substantially uniform efficiency.

A further object is to produce a generator which will produce a minimum of ozone, thus avoiding the necessity of irradiating food products in vacuum or inert gases and obviating the detrimental effects upon enzymes and fats and the creation of detrimental flavors in the food materials treated.

The principal features of the invention consist in incorporating into the structure materials having the faculty of preventing the absorption of gases by the electrodes while being capable of absorbing gases released by the electrodes, preventing the admixture of such released gases into the gas or mixture of gases in the tube between the electrodes, and further to stabilize the internal pressure within the tube.

A further important feature of the invention consists in the formation of the tube from material that will produce an insoluble, clear mass, transparent to ultra-violet rays of wave lengths shorter than twenty-six hundred A. U.

Figure 1 is a sectional diagrammatic illustration of a "geissler" type of tube constructed in accordance with this invention.

Figure 2 is a cross section through the line 2—2 of Figure 1.

Figure 3 is a cross section through the line 3—3 of Figure 1.

Figure 4 is a cross section through the line 4—4 of Figure 1.

Figure 5 is a cross section through the line 5—5 of Figure 1.

In constructing my improved form of generator, the tube is made of a suitable vitrioid substance, preferably consisting primarily of quartz and a suitable flux such as phosphorus pentoxide and/or other acidioxides such as boric oxide added only in sufficient amounts to perform the act of a flux. After thorough mixing the moulded material is made into tubes in accordance with common glass blowing technic.

The tubes, when constructed, are made of any shape to suit the use to which they are to be put, and they are preferably treated with a solution or suspension of $CaF_2$ and $NH_4F$ in $HF$. This treatment is applied inside and outside and effects the reduction of the thickness of the wall of the tube by corrosion, which results in less absorption of radiant energy by the tube in accordance with Beer's law, that is to say, the absorption of light by material is in direct proportion to the thickness of the absorbing material.

The treatment removes by dissolution a substantial part of the substances contained in the tube which are opaque to the shorter ultraviolet rays and it thereby increases the transparency of the tube to the shorter radiation, far beyond the transparency expected by the reduction of the wall thickness in accordance with Beer's law, thereby bringing the transmission of radiant energy down to or below twenty-four hundred and fifty A. U., and admitting more than two-thirds of the energy of the 2536–2537 band.

This treatment of the tube also has the effect of producing a fluorescent material or chemical compound as an integral part thereof which is believed to be due to the action of the fluorides upon certain (unknown) ingredients or impurities in the quartz which has the capability of absorbing almost all the radiant energy of wave lengths shorter than twenty-four hundred and fifty A. U., and by fluorescence re-emit such absorbed energy in an emission between twenty-five hundred and three thousand A. U. The exclusion of rays shorter than twenty-five hundred A. U. ensures the creation of a minimum of ozone. In the manufacture of the tube, the thickness should preferably be not more than 1.5 mm. before treatment and not substantially less than 1.0 mm. after treatment.

Within the tube thus constructed there is arranged within the enlarged ends A, the terminal wires B which are of a suitable copper (Cu) alloy and to the inner ends of each of these terminals B are secured the electrode-supporting rods C which are preferably of molybdenum (Mo) and these rods support at their end, the electrodes D which are preferably tubular in form and made of Swedish malleable iron known as Svea metal or other suitable material inert to the amalgamating action of mercury, for example, tungsten, iron, calcium, molybdenum and tantalum.

Mounted upon each electrode-supporting rod and heated thereby is a ferrule or sleeve E of calcium carbonate (CaCO$_3$) and also mounted upon each electrode support is a coiled strip F of metallic calcium, (Ca).

The presence of calcium carbonate or other suitable porous substances, which are inert to mercury, and have the ability to hold, by absorption, a relatively large volume of gas, together with metallic calcium, tends to stabilize the pressure of rare gas or gasses within the tube. The calcium, particularly when hot, absorbs all the oxygen and water vapours which, from time to time may be released by the electrodes and envelope. The porous material (marble) will release absorbed rare gas or gases such as argon in almost the same rate at which it is being absorbed by the electrodes and envelope. Thus the combination of the two substances, the metallic calcium and the porous material, will maintain a substantially constant internal pressure within the tube and thereby materially lengthen the useful life of the generator.

Placed within the tube is a small quantity of mercury (Hg) or other suitable material as indicated at G which will emit suitable resonant lines.

A generator of ultra-violet energy constructed in the manner described is extremely efficient. It will have an extraordinary length of life, and while a minor drop in emission is usually noticed after the first hundred hours, due apparently to solarization of the envelope or tube, the output of energy remains stable for more than ten thousand hours.

In the use of this generator, if the voltage and amperage is so adjusted in accordance with the length and diameter of the tube that the surface temperature does not increase more than a few degrees, the primary energy (which may be tested by using another tube of fluorite or quartz) will be distributed from the lowest lines in the spectrum, which is admitted by the tube and up to and into the infra red. However as the major part of the radiant energy will be emitted between twenty-five hundred and thirty-six hundred A. U. and other mercury resonant lines shorter than thirty-one hundred A. U. and about two percent. between thirty-one hundred A. U. and the visible spectrum, the intensity of the line 3660 is in co-relation to the temperature of the internal gas.

All or a substantial part of the primary radiant energy emitted of shorter wave length than twenty-four hundred and fifty A. U. will be absorbed by the fluorescent substance formed by the treatment of the tube in its manufacture, and such radiant energy is re-emitted as radiant energy in the spectrum between 2536 and 3000 A. U.

The fluorescence emitted appears as a continuous "haze" of light on the spectographic plate having its greatest intensity between 2536 and 2700 A. U. and appears to have no lines other than the mercury resonant lines. It is found, on careful analysis, that the spectrum of this fluorescent generator is to be far more antirachitically and bacteriacidally actinic per erg than any of the resonance lines of mercury singly or combined.

What I claim as my invention is:

1. A generator for ultra-violet energy having a tube formed of quartz combined with a flux having the characteristics of phosphorus pentoxide and having a fluoride-reacted surface.

2. A generator for ultra-violet energy having a tube formed essentially of quartz combined with phosphorus pentoxide and having a fluoride-reacted surface.

3. A generator for ultra-violet energy comprising a fluorescent tube of fluoride-treated quartz material capable of emitting antirachitic rays when exposed to radiant energy of a shorter ultra-violet wave length than that of antirachitic rays.

4. A generator for ultra-violet energy comprising a fluorescent tube of fluoride-treated quartz material capable of emitting germicidal rays when exposed to radiant energy of a shorter ultra-violet wave length than that of the germicidal spectrum.

5. An ultra-violet generator comprising a fluorescent material having the characteristic of emitting antirachitic energy of a longer wave length when exposed to a shorter ultra-violet wave length outside the antirachitic band, said material including a fluoride-treated quartz material having incorporated therein a flux of the character of phosphorus pentoxide.

6. A generator for ultra-violet energy comprising a fluorescent material composed essentially of fluoride-treated quartz combined with a flux of the character of phosphorus pentoxide and having the characteristic of emitting bactericidal energy of a longer wave length when exposed to radiant energy of a shorter ultra-violet wave length outside the bactericidal band.

7. A generator as defined in claim 3 capable of emitting fluorescent rays between 2500 and 3132 A. U. when exposed to radiant energy of a shorter ultra-violet wave length than 2500 A. U.

8. An ultra-violet generator having a fluoride-reacted fluorescent tube composed essentially of quartz and flux of the character of phosphorus pentoxide and having the characteristic of fluorescing ultra-violet energy from approximately 2500 A. U. to approximately 3000 A. U. when exposed to rays ranging from the near X-ray spectrum to 2400 A. U.

9. A generator for ultra-violet energy comprising in combination a fluorescent tube of quartz combined with a flux or fluxes or the class of phosphorus pentoxide and presenting a surface which is the result of reaction therewith of a solution of CaF$_2$ and NH$_4$F in HF, said surface being characterized by its ability to absorb almost all of the radiant energy of wave lengths shorter than 2450 A. U., and to emit such absorbed energy in an emission between 2500 and 3000 A. U.

10. A generator for ultra-violet energy comprising in combination a fluorescent tube formed essentially of quartz and phosphorus pentoxide and presenting a fluoride-reacted surface capable of emitting ultra-violet energy in the spectrum between 2450 and 3000 A. U. when subjected to ultra-violet rays of shorter wave length, said tube containing a quantity of mercury, electrodes arranged in said tube formed of a material inert to the amalgamating action of mercury and selected from the iron, tungsten, molybdenum and tantalum groups, and means for absorbing gases generated by said electrodes.

11. A generator for ultra-violet energy comprising in combination a tube of quartz and phosphorus pentoxide having a fluoride reacted fluorescent surface capable of absorbing substantially all the radiant energy of ultra-violet rays of wave lengths shorter than 2400 A. U. and by fluorescence emitting same at a wave length above 2500 A. U., said tube containing a quantity of mercury, electrodes arranged in said tube of a material inert to the amalgamating action of mercury and selected from the iron, tungsten, molybdenum and tantalum groups, and means for absorbing gases generated by said electrodes.

12. A method of rendering quartz capable of emitting anti-rachitic energy of a longer wave length when exposed to shorter ultra-violet wave lengths, comprising associating with the quartz a flux having the characteristic of phosphorus pentoxide and finally treating the said quartz with a fluoride.

13. A method of rendering quartz capable of absorbing substantially all the radiant ultra-violet energy of wave lengths shorter than twenty-four hundred and fifty A. U. and of emitting such absorbed energy at between twenty-five hundred and three thousand A. U. comprising first combining the quartz with a suitable flux or fluxes including phosphorous pentoxide, and thereafter treating the quartz with a solution or suspension of $CaF_2$ and $NH_4F$ in $HF$.

14. A method as claimed in claim 13 in which said treatment of the quartz is first made in the form of a tube and the treatment is prolonged until a substantial reduction in the thickness thereof is achieved by dissolution and the removal of a substantial part of the substances contained therein which are opaque to the shorter ultra-violet rays whereby the transparency of the tube to shorter ultra-violet rays is increased.

15. A method as claimed in claim 13 in which the tube is first formed with a wall thickness of preferably not more than 1.5 mm. before treatment and the treatment is prolonged until the wall thickness has been reduced to not substantially less than 1.0 mm.

HALFDAN HEBO.